United States Patent
Onodera et al.

(10) Patent No.: US 11,176,283 B2
(45) Date of Patent: Nov. 16, 2021

(54) ANALYSIS MODEL CREATION ASSISTANCE DEVICE AND ANALYSIS MODEL CREATION ASSISTANCE METHOD

(71) Applicant: HITACHI, LTD., Tokyo (JP)

(72) Inventors: Makoto Onodera, Tokyo (JP); Masayuki Hariya, Tokyo (JP); Chikara Kongou, Tokyo (JP); Masaki Shintani, Tokyo (JP); Qi He, Tokyo (JP)

(73) Assignee: HITACHI, LTD., Tokyo (JP)

( * ) Notice: Subject to any disclaimer, the term of this patent is extended or adjusted under 35 U.S.C. 154(b) by 360 days.

(21) Appl. No.: 16/068,737

(22) PCT Filed: Feb. 14, 2017

(86) PCT No.: PCT/JP2017/005236
§ 371 (c)(1),
(2) Date: Jul. 9, 2018

(87) PCT Pub. No.: WO2017/159173
PCT Pub. Date: Sep. 21, 2017

(65) Prior Publication Data
US 2019/0026399 A1    Jan. 24, 2019

(30) Foreign Application Priority Data
Mar. 16, 2016  (JP) .............................. JP2016-052537

(51) Int. Cl.
G06F 30/00   (2020.01)
G06F 16/583   (2019.01)
G06T 17/20   (2006.01)

(52) U.S. Cl.
CPC .......... *G06F 30/00* (2020.01); *G06F 16/5854* (2019.01); *G06T 17/20* (2013.01)

(58) Field of Classification Search
CPC ...... G06F 30/00; G06F 16/5854; G06T 17/20
See application file for complete search history.

(56) References Cited

U.S. PATENT DOCUMENTS

2012/0239359 A1 * 9/2012 Furuya .................... G06F 30/23
                                                           703/2
2014/0035809 A1 * 2/2014 Muto ...................... G06T 17/20
                                                           345/156

FOREIGN PATENT DOCUMENTS

WO    2015/092842 A1   6/2015

OTHER PUBLICATIONS

Cao et al. "3D shape regression for real-time facial animation." ACM Transactions on Graphics (TOG)—SIGGRAPH 2013 Conference Proceedings | Jul. 2013, vol. 32(4). (Year: 2013).*

(Continued)

*Primary Examiner* — Saif A Alhija
(74) *Attorney, Agent, or Firm* — Mattingly & Malur, PC (57) ABSTRACT

A shape search unit (22) that repeats processes of comparing each shape element of current shape data (11*a*) or previous difference shape data (12*a*) with each shape element of existing shape data (11*b*), setting a set of shape elements that are similar to each other as a result of the comparison as common shape data (12*b*), on the other hand, and setting a set of shape elements that are not similar to each other as next difference shape data (12*a*), until the common shape data (12*b*) is not extracted from the difference shape data (12*a*), a common mesh extraction unit (23*b*) that searches for corresponding common mesh data (13*b*) from an existing model database (11*x*) using the common shape data (12*b*) as a search key are provided.

5 Claims, 9 Drawing Sheets

(56) References Cited

OTHER PUBLICATIONS

Extended European Search Report received in corresponding European Application No. 17766180.8 dated Aug. 23, 2019.
Cao, C. et al., "3D Shape Regression for Real-time Facial Animation", ACM Transactions on Graphics, Jul. 2013, p. 11:1-41:10, vol. 32, No. 4.
International Search Report of PCT/JP2017/005236 dated May 9, 2017.

* cited by examiner

| NUMBER OF TIMES n | 12b COMMON SHAPE DATA<br>12a DIFFERENCE SHAPE DATA | 13b COMMON MESH DATA<br>13a DIFFERENCE MESH DATA |
|---|---|---|
| n=1 | 212, 213 | 212m, 213m |
| n=2 | 222 | 222m |
| n=3 | 232, 233, 234 | 232m, 233m, 234m |
| n=4 | 241 | 241m |

ANALYSIS MODEL CREATION ASSISTANCE DEVICE AND ANALYSIS MODEL CREATION ASSISTANCE METHOD

This application is based upon and claims the benefit of priority from Japanese Patent Application No. 2016-52537, filed on Mar. 16, 2016, the entire contents of which are incorporated herein by reference.

TECHNICAL FIELD

The present invention relates to an analysis model creation assistance device and an analysis model creation assistance method.

BACKGROUND ART

As a method for elucidating a phenomenon or solving a problem, a numerical simulation by a finite element method and the like is widely used. In order to perform the simulation by the finite element method (hereinafter referred to as an analysis), it is necessary to create an analysis model from input shape data of a Computer-Aided Design (CAD) or the like. As the continuous improvement of a computer process capability and an analysis technique, the scale of the analysis model is becoming larger and the analysis model is being more detailed, and thus it is expected that a further progress will be made in the future. In addition, since quality of a mesh in the analysis model has a great influence on analysis accuracy, it is important to set an indicator of the mesh quality and create the mesh according to the indicator. From such a situation, a burden of a creation work of the analysis model is being increased.

Therefore, PTL 1 discloses a system that compares CAD data of input new design shape with template CAD data registered in a database, and when the CAD data of the new design shape includes the template CAD data, diverts template mesh data corresponding to the template CAD data to reduce cost for creating mesh data.

CITATION LIST

Patent Literature

PTL 1: WO2015/092842 A

SUMMARY OF INVENTION

Technical Problem

In the system of PTL 1, when the CAD data of the new design shape is input in a state in which all pieces of the template CAD data are included in the CAD data, the mesh data may be diverted. Therefore, partial CAD data to be a template and the mesh data are required to be prepared in advance.

On the other hand, in existing analyzed CAD data, a large number of pieces of template CAD data such as a nail shape for a combination are dispersed to one single article in many cases. Therefore, a work of extracting the template CAD data of a portion where general versatility is high (a portion that may be diverted) such as the claw shape from one article and making the template CAD data of the portion where general versatility is high into a database was necessary as the preparation process of the mesh diversion process. Since the preparation process is manually performed, the preparation process is a burden to the user.

Therefore, a main object of the present invention is to create an analysis model that is easily diverted at low cost.

Solution to Problem

In order to solve the above-described problems, an analysis model creation assistance device of the present invention includes an existing model database that associates analyzed existing shape data with existing mesh data that is an analysis result of the existing shape data, a shape search unit that repeats processes of comparing each shape element of input current shape data with each shape element of the existing shape data, setting a set of shape elements that are similar to each other as a result of the comparison as common shape data, on the other hand, setting a set of shape elements that are not similar to each other as difference shape data, comparing each shape element of previous difference shape data with each shape element of the existing shape data, setting a set of shape elements that are similar to each other as a result of the comparison as the common shape data, on the other hand, and setting a set of shape elements that are not similar to each other as next difference shape data, until the common shape data is not extracted from the difference shape data, a common mesh extraction unit that searches for corresponding common mesh data from the existing model database using the common shape data as a search key, and a mesh combination unit that combines the searched common mesh data with difference mesh data created from the difference shape data to create current mesh data corresponding to the input current shape data.

Other means will be described later.

Advantageous Effects of Invention

According to the present invention, it is possible to create an analysis model that is easily diverted at low cost.

BRIEF DESCRIPTION OF DRAWINGS

FIG. 5($a$) is a description diagram illustrating a process content of a common mesh disposition unit. FIG. 5($b$) is a description diagram illustrating a process content of a mesh combination unit.

FIG. 7($a$) is a diagram illustrating current shape data. FIG. 7($b$) is a diagram illustrating common mesh data. FIG. 7($c$) is a diagram illustrating common mesh data.

DESCRIPTION OF EMBODIMENTS

Hereinafter, an embodiment of the present invention will be described in detail with reference to the drawings.

Figure 1:
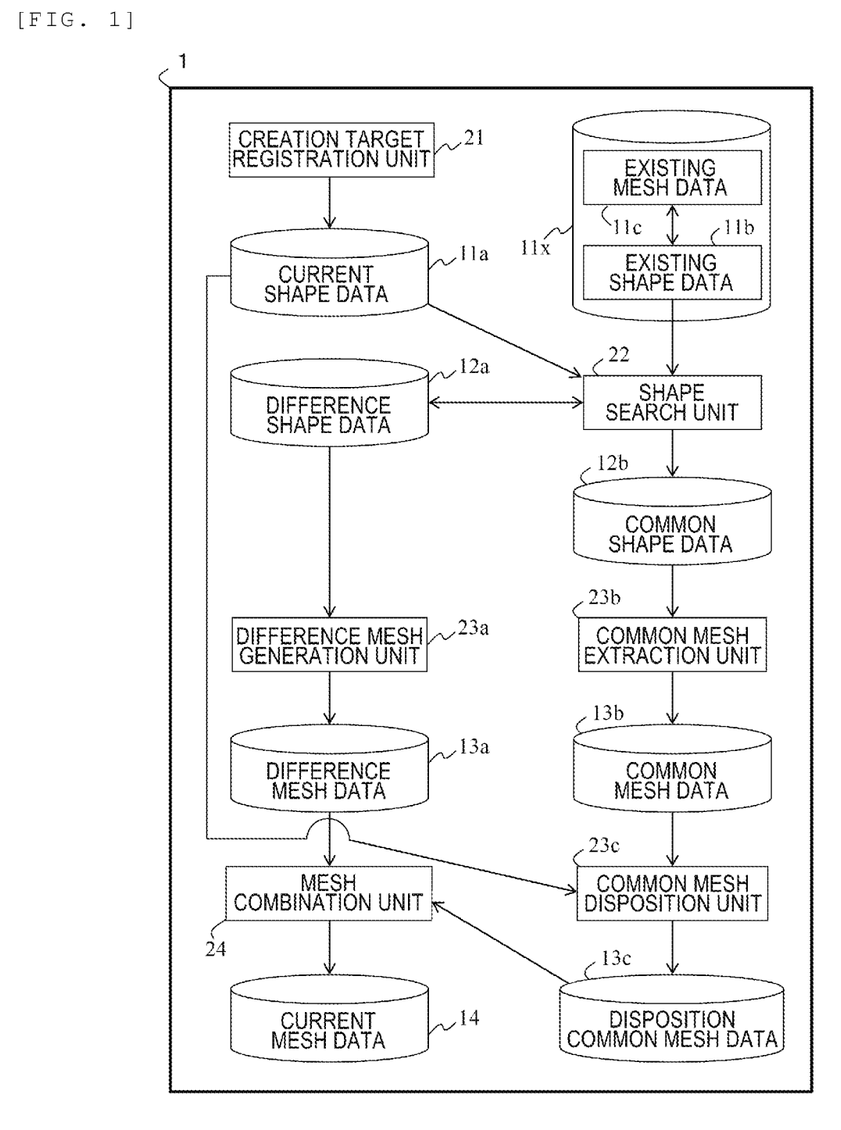
FIG. 1 is a configuration diagram of an analysis model creation assistance device according to an embodiment of the present invention.

FIG. 1 is a configuration diagram of an analysis model creation assistance device 1. The analysis model creation assistance device 1 is configured as a computer having a Central Processing Unit (CPU), a memory, storage means (storage unit) such as a hard disk, and a network interface.

The CPU executes a program (also referred to as an application or an app that is an abbreviation of the application) read on the memory, and thus the computer operates a control unit (control means) configured by each process unit.

In the storage means of the analysis model creation assistance device 1, current shape data 11a, existing shape data 11b, existing mesh data 11c, difference shape data 12a, common shape data 12b, difference mesh data 13a, common mesh data 13b, disposition common mesh data 13c, and current mesh data 14 are stored.

In addition, the existing shape data 11b and the existing mesh data 11c are managed in an existing model database 11x in association with each other. That is, when a search using the existing shape data 11b as a search key is required to the existing model database 11x, the existing mesh data 11c corresponding to the search key may be searched from the existing model database 11x.

In addition, the control means of the analysis model creation assistance device 1 operates a creation target registration unit 21, a shape search unit 22, a shape search unit 22, a mesh combination unit 24, a difference mesh generation unit 23a, a common mesh extraction unit 23b, and the common mesh disposition unit 23c as a process unit.

The following is a description when data handled by the analysis model creation assistance device 1 is classified in a data format.

For example, the various pieces of shape data (the current shape data 11a, the existing shape data 11b, the difference shape data 12a, and the common shape data 12b) is goods data including a plurality of characteristic shapes such as a rib, a boss, a snap fit shape for an engagement, or product data including a plurality of pieces of the goods data. The various pieces of shape data are stored in the analysis model creation assistance device 1 as a configuration geometric shape (individual "shape element" configured as a plane or a line) of CAD data.

The various pieces of mesh data (the existing mesh data 11c, the difference mesh data 13a, the common mesh data 13b, the disposition common mesh data 13c, and the current mesh data 14) are analysis results of a simulation by a finite element method for the various pieces of the shape data, and for example, are stored in the analysis model creation assistance device as three-dimensional mesh data. In addition, the disposition common mesh data 13c is obtained by disposing the common mesh data 13b in a space suitably for the current shape data 11a.

The following is a description when the data handled by the analysis model creation assistance device 1 is classified on a time axis before and after an analysis.

First, existing data (the existing shape data 11b and the existing mesh data 11c that is an analysis result of the existing shape data) is already analyzed data in the past. On the other hand, current data (the current shape data 11a and the current mesh data 14) is data to be analyzed this time (from now on). That is, an input of a current analysis is the current shape data 11a, and an output thereof is the current mesh data 14.

Common data (the common shape data 12b, the common mesh data 13b, and the disposition common mesh data 13c) is data that may be diverted as a common element such as having similar or identical shapes between the existing data and the current data.

Difference data (the difference shape data 12a and the difference mesh data 13a) is data that does not correspond to the common data between the existing data and the current data, and may be data of which shapes are not similar.

Hereinafter, each process unit of the analysis model creation assistance device 1 will be described.

The creation target registration unit 21 receives the input current shape data 11a and registers the data in the storage means. On the other hand, in the existing model database 11x, the existing shape data 11b and the existing mesh data 11c are registered in association with each other in advance.

The shape search unit 22 compares the current shape data 11a with the existing shape data 11b, extracts portions that are similar to each other as shape elements as the common shape data 12b, and extracts portions that are not similar to each other as the difference shape data 12a.

The common mesh extraction unit 23b searches for the corresponding existing mesh data 11c from the existing model database 11x using the existing shape data 11b, that is extracted as the common shape data 12b, as a search key, and extracts a search result as the common mesh data 13b.

The difference mesh generation unit 23a creates a new mesh using the difference shape data 12a as an input, and sets a result thereof as the difference mesh data 13a.

The common mesh disposition unit 23c disposes each common mesh data 13b at a corresponding position of the current shape data 11a, and sets the disposition result as the disposition common mesh data 13c.

The mesh combination unit 24 combines the difference mesh data 13a with the disposition common mesh data 13c to create the current mesh data 14 corresponding to the current shape data 11a.

Figure 2:
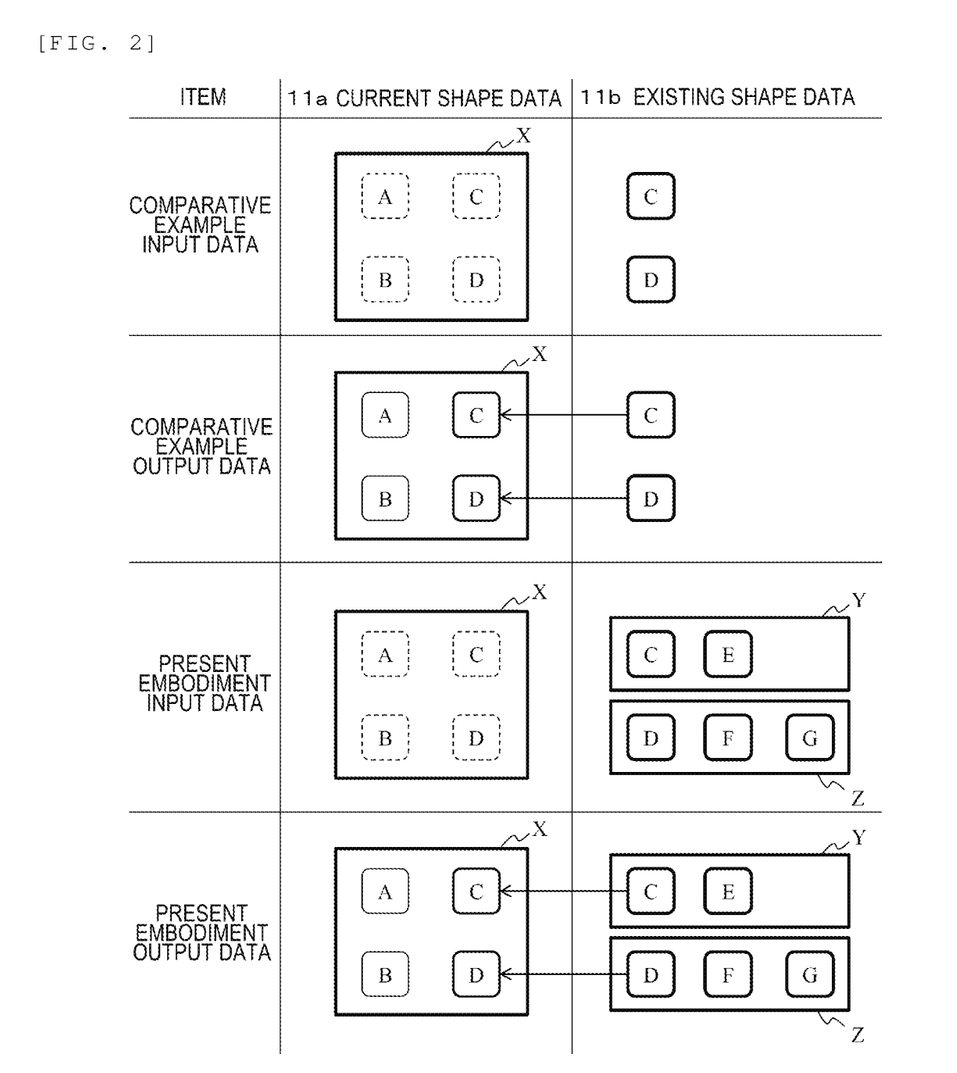
FIG. 2 is a comparison diagram between the analysis model creation assistance device of FIG. 1 according to an embodiment of the present invention and a comparative example.

FIG. 2 is a comparison diagram between the analysis model creation assistance device 1 of FIG. 1 and a comparative example. The "current data" and the "existing data" described with reference to FIG. 1 are set to be respective columns of FIG. 2. The "present embodiment" of third and fourth rows of a comparison table corresponds to the shape search unit 22 of the analysis model creation assistance device 1 of FIG. 1.

For example, "comparative example" of first and second rows of the comparison table is shape search means (alternative means of the shape search unit 22) disclosed in [Hongshen Wang, Lin Zhang and Yonggui Zhang, "Partial Matching of 3D CAD Models with Attribute Graph", Applied Mechanics and Materials, Vol. 528 (2014), pp. 302-309] or [Makoto Onodera, four others, "Development of similar partial shape recognition technology for boundary expression 3D-CAD model", Proceedings of the 25th Design Engineering and System Division Lecture Meeting of the Japan Society of Mechanical Engineers (2015)].

The shape search means of the comparative example quantifies whether or not the existing shape data 11b designated as the search key is included in the current shape data 11a by an index of similarity. In addition, the similarity is used as a weighted average of similarity in a shape element unit.

As a first row indicating input data of the comparative example, the current shape data 11a (goods X including elements A, B, C and D), the existing shape data 11b (shape data of the elements C and D), and the existing mesh data 11c (mesh data of the elements C and D) are input. Each element of the current shape data 11a at current time point is surrounded by a broken line to indicate that each element is an element before creating a mesh. On the other hand, each element of the existing shape data 11b at the current time point is surrounded by a bold line to indicate that each element is an element after creating the mesh.

As a second row indicating output data of the comparative example, the shape search means of the comparative example may divert the mesh data of already created elements C and D with respect to the elements C and D that are entirely included in the current shape data 11a (an existing diversion is indicated by a thick line). On the other hand, with respect to elements A and B that are not included in the current shape data 11a, it is necessary to newly create mesh data (a new creation is indicated by a thin line).

That is, in the shape search means of the comparative example, only the elements included in the current shape data 11a are diversion target of the mesh data.

As a third row indicating input data of the present embodiment, the current shape data 11a (goods X including elements A, B, C and D), the existing shape data 11b (shape data of goods Y and Z), and the existing mesh data 11c (mesh data of the goods Y and Z) are input. In addition, the goods Y include elements C and E, and the goods Z include elements D, F, and G.

As a fourth row indicating output data of the present embodiment, when comparing the goods X of the current shape data 11a with the goods Y and Z of the existing shape data 11b, the shape search unit 22 compares similarity/dissimilarity for each element that is apart of such goods. Therefore, the shape search unit 22 diverts the mesh data of the element C that is a part of the goods Y with respect to the element C that is a part of the current shape data 11a. In addition, the shape search unit 22 may divert the mesh data of the element D that is a part of the goods Z with respect to the element D that is a part of the current shape data 11a.

That is, in the comparative example and the present embodiment, as long as the elements C and D included in the current shape data 11a are registered as individual goods in the existing shape data 11b, the fact that it is possible to divert such mesh data is common. On the other hand, in the comparative example, it is necessary to divide the goods for each of the elements C and D in advance. However, in the present embodiment, it is not necessary to divide the elements C and D from the goods Y and Z, and it is possible to reduce labor for preparing existing data.

In other words, when comparing the goods X with the goods Y and Z, the shape search unit of the comparative example determines that the goods X and the goods Y and Z are dissimilar as a whole of constituting elements, and therefore the mesh data is not diverted nonetheless the elements C and D can be partly diverted.

Figure 3:
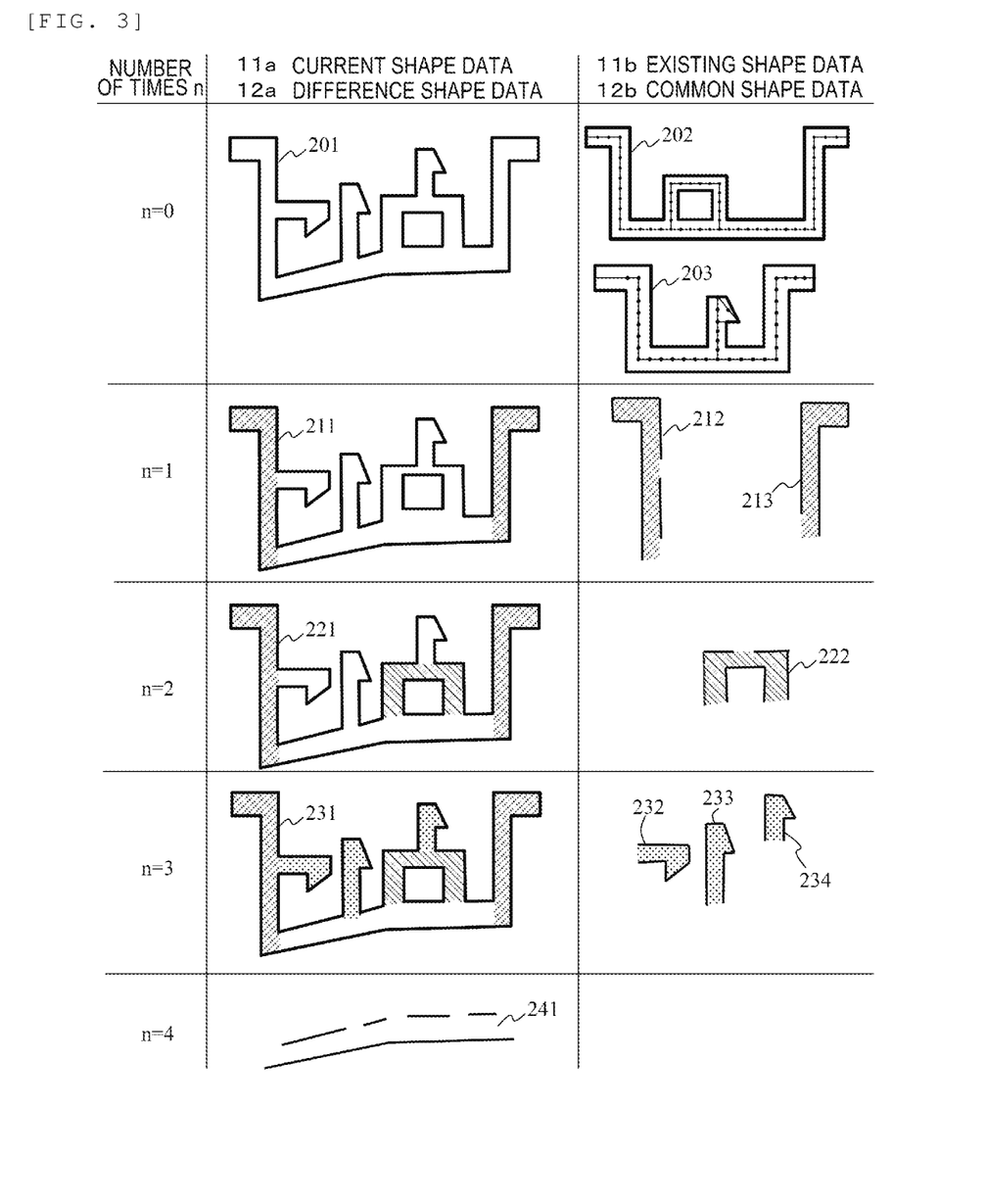
FIG. 3 is a description diagram illustrating a process content of a creation target registration unit and a shape search unit according to an embodiment of the present invention.

FIG. 3 is a description diagram illustrating a process content of the creation target registration unit 21 and the shape search unit 22. In addition, in the present embodiment, in order to make it easy to understand, a shape of planar two-dimensional data is shown as an example, however, the present embodiment may also be applied to three-dimensional data of a three-dimensional.

A second column of FIG. 3 indicates the current shape data 11a (n=0) or the difference shape data 12a (n>0).

A third column of FIG. 3 indicates the existing shape data 11b (n=0) or the common shape data 12b (n>0).

The "number of times n" of a first column of FIG. 3 indicates the number of times of a process of cutting out a part of shape data of the second row as shape data of the third row.

Regarding a first row "n=0", the creation target registration unit 21 accepts a registration of the current shape data 11a indicated by a reference numeral 201. In addition, in the existing model database 11x, two types of shapes 202 and 203 are registered as the existing shape data 11b of which the existing mesh data 11c is created (meshed).

Regarding a second row "n=1", the shape search unit 22 compares the shape of the reference numeral 201 of the current shape data 11a with the shapes of the reference numerals 202 and 203 of the existing shape data 11b, and outputs a comparison result indicating that an L shape (diagonal line portion) of the left and right of the current shape data 11a is similar to a part of the existing shape data 11b. Therefore, as shown in reference numerals 212 and 213, based on the comparison result, the shape search unit 22 extracts the L shape (diagonal line portion) of the left and right as the common shape data 12b. In addition, the shape search unit 22 sets the remaining (the current shape data 11a of a reference numeral 211 in which the diagonal line portion is not spread) as the difference shape data 12a that is a next time comparison target.

Regarding a third row "n=2", the shape search unit 22 compares the shape of the reference numeral 211 of the difference shape data 12a (except for the diagonal line portion) with the shapes of the reference numerals 202 and 203 of the existing shape data 11b, and outputs a comparison result indicating that a U shape (diagonal line portion) of the central portion is similar to a part of the existing shape data 11b. Therefore, based on the comparison result, the shape search unit 22 extracts the U shape of the central portion (a reference numeral 222) as the common shape data 12b. In addition, the shape search unit 22 sets the remaining (a white portion in which the diagonal line portion is not spread even when n=1 or n=2) as the difference shape data 12a (a reference numeral 221) that is a next time comparison target.

Regarding a fourth row "n=3", the shape search unit 22 searches for a shape that is partially similar to the existing shape data 11b from the difference shape data 12a similarly to the case n=2. As a result, three hook portions 232 to 234 are searched as the common shape data 12b. Since the existing shape data 11b that is partially similar to the difference shape data 12a remained as other portions of the reference numeral 231 is not newly searched by the search described above, a search process by the shape search unit 22 is ended here.

Regarding a fifth row "n=4", the shape search unit 22 determines a bottom portion 241 that is other than the diagonal line portion of the reference numeral 231 as the difference shape data 12a. In addition, the shape search unit 22 also determines common shape data 12b (the reference numerals 212, 213, 222, and 232 to 234) each searched when n=1 to 3.

Figure 4:
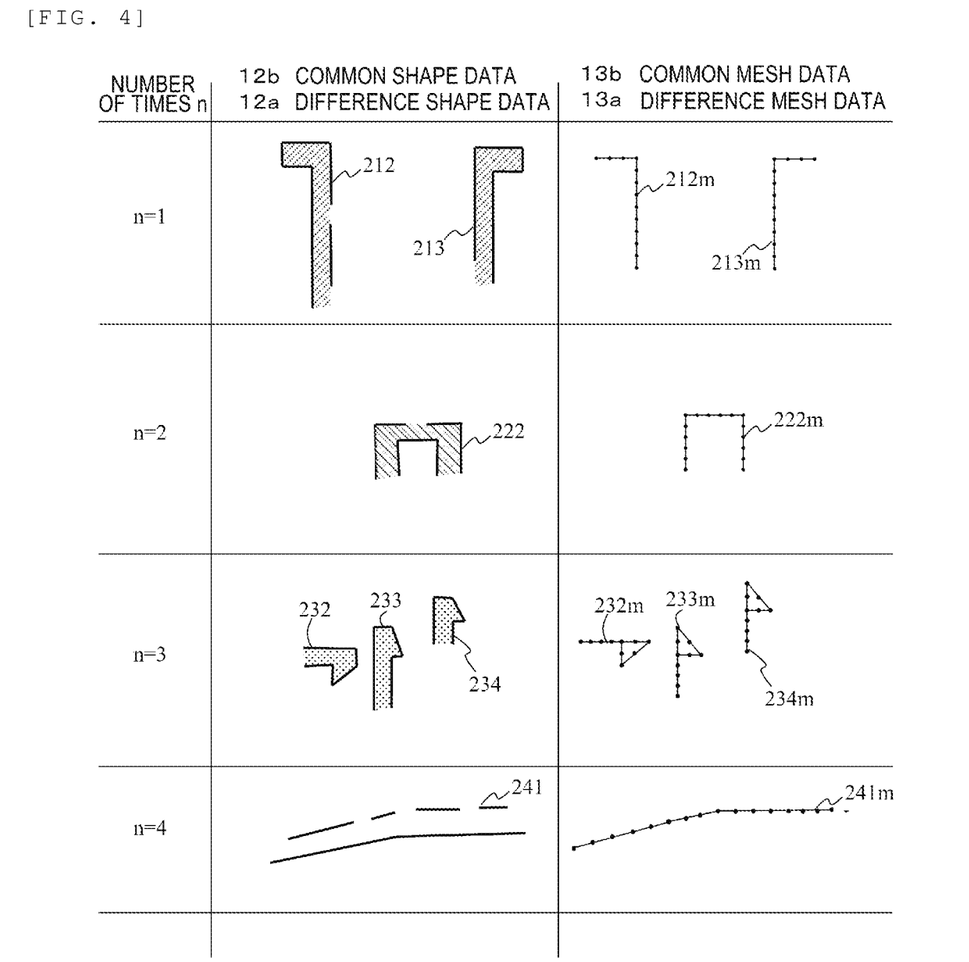
FIG. 4 is a description diagram illustrating process contents of a difference mesh generation unit and a common mesh extraction unit according to an embodiment of the present invention.

FIG. 4 is a description diagram illustrating process contents of the difference mesh generation unit 23a and the common mesh extraction unit 23b. A first column "number of times n" corresponds to FIG. 3 and FIG. 4. A second row of FIG. 4 is each shape data (the common shape data 12b and the difference shape data 12a) shown in FIG. 3, and a third column of FIG. 4 is data obtained by meshing the shape data of a corresponding second row (the common mesh data 13*b* and the difference mesh data 13*a*).

First, first to third rows "n=1 to 3" will be described. The common mesh extraction unit 23*b* reads the existing mesh data 11*c* corresponding to the common shape data 12*b* from the existing model database 11*x* and sets the read result as the common mesh data 13*b*. Here, in order to make it easy to understand a correspondence relationship between the shape data and the mesh data corresponding to the shape data, in FIG. 4, mesh data (for example, 212*m*) with "m" appended to an end of a reference numeral of the shape data (for example 212) is described so as to correspond thereto.

In addition, at each node of the existing mesh data 11*c*, when a positional relationship between a shape element of the existing shape data 11*b* that minimizes the distance to the node of the existing shape data 11*b* and a shape element of the existing mesh data 11*c* to which a node thereof belongs is substantially parallel to each other, the common mesh extraction unit 23*b* associates both the parallel data with each other.

In addition, the common mesh extraction unit 23*b* extracts the existing mesh data 11*c* associated with the shape element of the common shape data 12*b* among the existing shape data 11*b* as the common mesh data 13*b*. In addition, instead of calculating the distance between each node and each shape element, the distance between the center of gravity point of the existing mesh data 11*c* and the shape element of the existing shape data 11*b* may be calculated. In addition, information indicating a relationship with the existing shape data 11*b* calculated in advance at the time of creating the existing mesh data 11*c* may be used.

Regarding a fourth row "n=4", the difference mesh generation unit 23*a* newly create a mesh with respect to the difference shape data 12*a* of the reference numeral 241, and sets the result as the difference mesh data 13*a* of a reference numeral 241*m*. The difference mesh generation unit 23*a* may use, for example, a technology disclosed below as means for creating the mesh.

JP-A-H8-138082 discloses a system for automatically generating a quadrangle mesh in which sides of a quadrangle element are arranged along a boundary as much as possible with respect to an input figure.

JP-A-H11-110586 discloses a system for generating a mesh by generating a bubble in an area of a shape that is a target of a mesh creation.

In addition, since a configuration surface of the common shape data 12*b* is deleted from the current shape data 11*a* in the difference shape data 12*a*, the difference shape data 12*a* has an open shell structure shape in which a plurality of holes included and it is not possible to create a normal mesh because it is not possible to configure a closed space in some cases. In this case, it is preferable that the difference mesh generation unit 23*a* performs a filling process using a technology disclosed in, for example, [Tanimoto, Nakamura, Takei, "Development of a filling surface creation function using CAE technology", Proceedings of the Precision Engineering Society Conference Lecture, 2010 (0), pp. 133-134].

Figure 5:
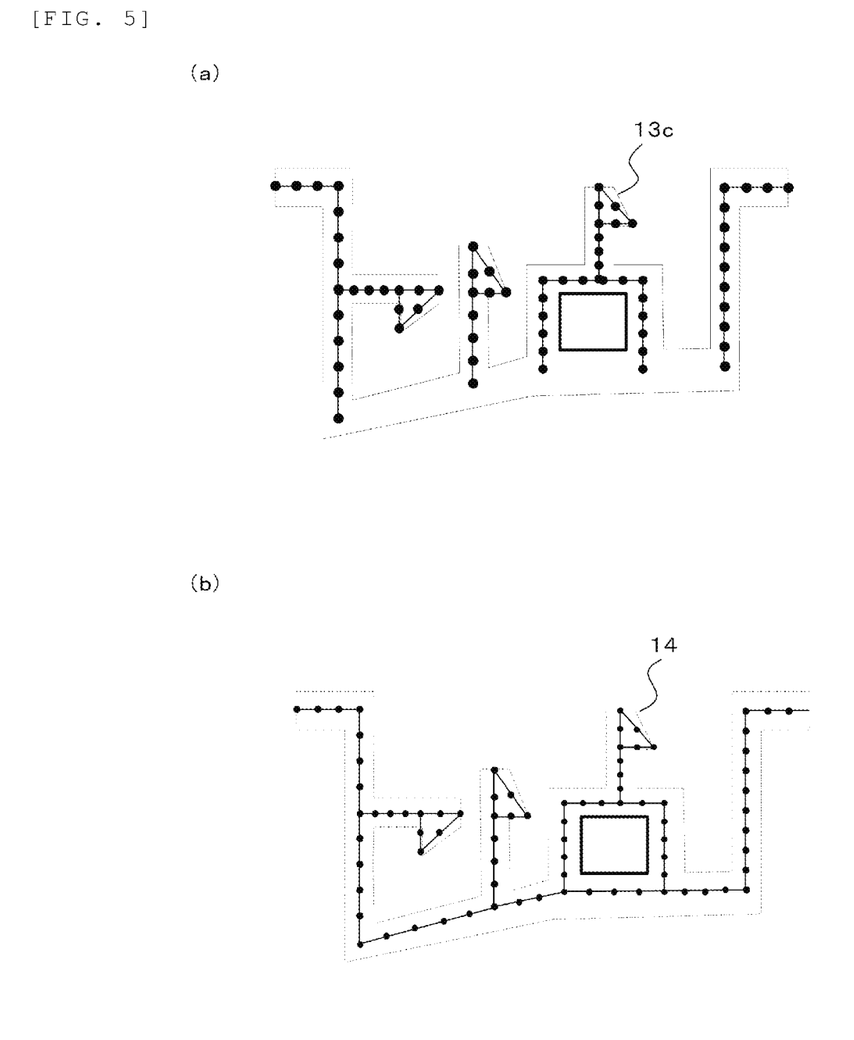

FIG. 5(*a*) is a description diagram illustrating a process content of the common mesh disposition unit 23*c*.

The common mesh disposition unit 23*c* disposes each common mesh data 13*b* of which the end of the reference numeral is "m" in FIG. 4 so that the shape matches the current shape data 11*a* indicated by the reference numeral 201 of FIG. 3. As a result of the disposition, the common mesh disposition unit 23*c* sets the common mesh data 13*b* of which the position or the size is adjusted as the disposition common mesh data 13*c* shown in FIG. 5(*a*).

FIG. 5(*b*) is a description diagram illustrating a process content of the mesh combination unit 24. The mesh combination unit 24 combines the difference mesh data 13*a* of the mesh data string indicated by the reference numeral 241*m* of FIG. 4 and the disposition common mesh data 13*c* of FIG. 5(*a*), and sets the combination result as the current mesh data 14 shown in FIG. 5(*b*). That is, most of the current mesh data 14 obtained by meshing the current shape data 11*a* may use data that may flow without newly meshing by the common shape data 12*b*.

Figure 6:
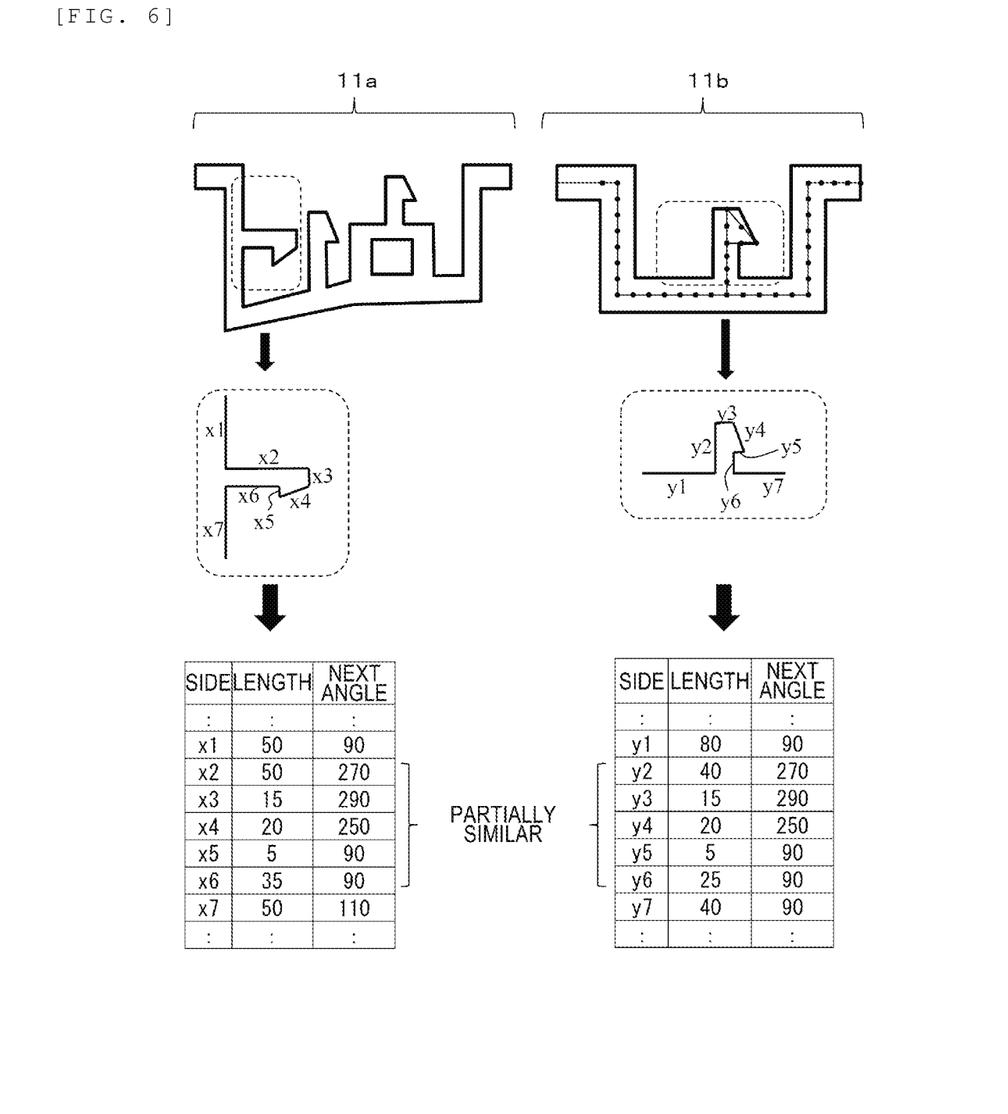
FIG. 6 is a diagram illustrating details of a process of the shape search unit according to an embodiment of the present invention.

FIG. 6 is a diagram illustrating details of the process of the shape search unit 22.

The shape search unit 22 partially compares the shape of the current shape data 11*a* (or the difference mesh data 13*a*) with the existing shape data 11*b*. With respect to the hook portion that is a part of both shapes, the shape search unit 22 allocates IDs (x1 to x7) of each side of a current shape and IDs (y1 to y7) of each side of an existing shape. Next, the shape search unit 22 obtains the lengths of each side and the angle (next angle) between two sides having a common contact. For example, the next angle is the angle between the next sidex2 to be connected as seen from the sidex1 and the sidex1, and since the sidex2 is connected at 90 degrees counterclockwise from the sidex1, the next angle is "90".

The shape search unit 22 compares a table of feature data of the current shape extracted as described above with a table of feature data of the existing shape, and extracts portions (x2 to x6 and y2 to y6) that are partially similar among a set of shape elements sequentially connected to the node or the like as a partial similar shape.

In addition, for example, the comparison process of the shape search unit 22 is a process of excluding a side of which a similarity is less than a predetermined value in a side unit or a side of which a connection relationship between sides is different from a search target and a search key and calculating the similarity of only side having a value equal to or greater than a predetermined value. In addition, the shape search unit 22 searches for partially similar portions by performing the search while excluding unmatched sides from the search target and the search key.

Here, the "side" of the shape data is an example of the shape element. In a case of three-dimensional data, the shape element is a "surface". Therefore, for example, in addition to the similarity of the lengths of the sides, the fact that two shape elements are similar to each other may be determined based on various geometric features such as the similarity of types of line segment such as straight lines or arcs, the similarity of the areas of surfaces, the similarity of a sum of contour lines (sides) configuring a surface, and the similarity of a shape of a surface such as a hemispherical shape.

In addition, in FIG. 6, the next angle exemplified as the "connection relation" between the sides may be phase information. In addition, relationship information such as the distance between surfaces of the distance between the sides, the angle between surfaces, or the like may be added by expanding the connection relationship.

Hereinafter, with reference to FIG. 7, a process when two pieces of the common shape data 12*b* are extracted from one piece of current shape data 11*a* by one search will be described.

Figure 7:
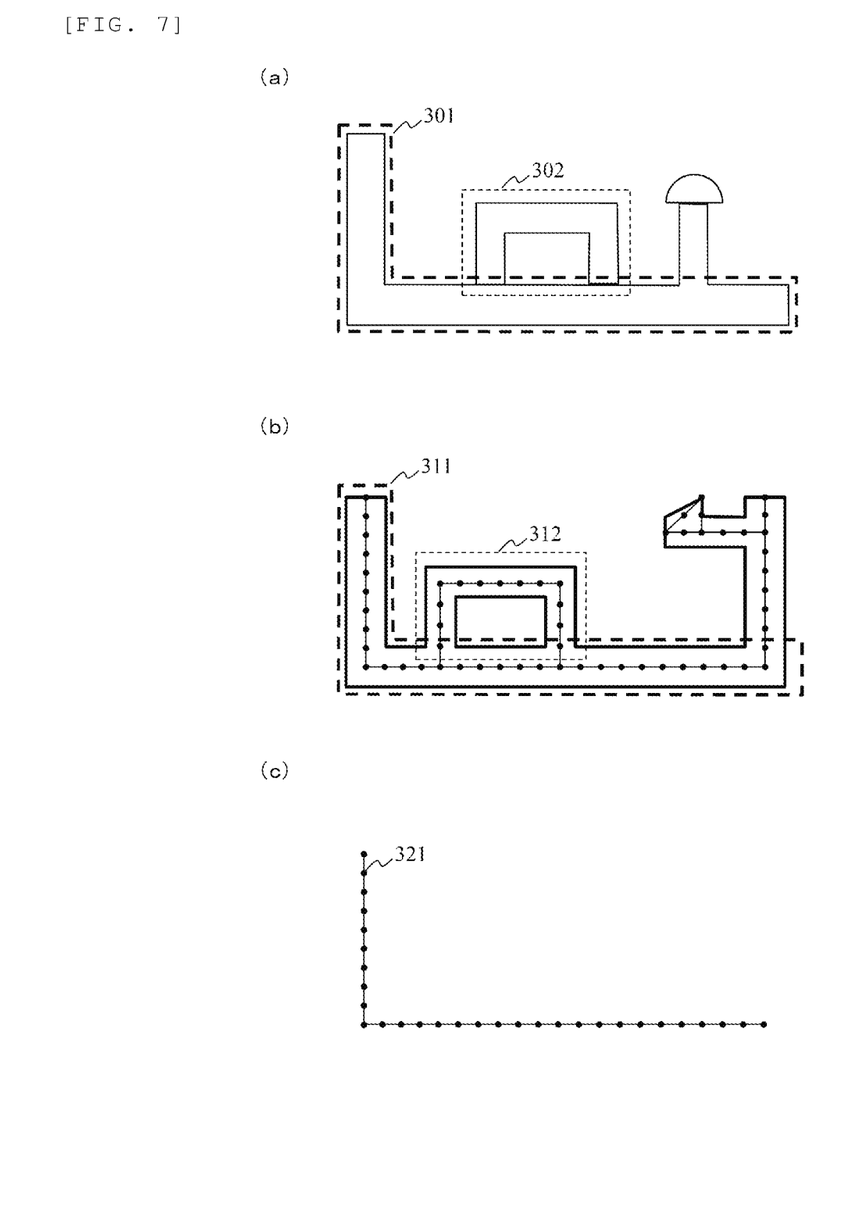

First, in the current shape data 11*a* of FIG. 7(*a*), there is an enclosed portion 301 of an L shape at a lower left and a portion 302 surrounded by a central U shape. In addition, since there also are both of an L shape portion 311 and a U shape portion 312 in the existing shape data 11*b* of FIG.

7(b), the shape search unit 22 extracts the common shape data 12b of two portions of an L shape and a U shape by one search process (for example, in a case of n=1). At this time, the shape search unit 22 adopts the L shape portion 311 as the common shape data 12b preferentially than the portion of the U shape portion 312 due to the following reasons.

The area (or a ridge line length) of the L shape portion 311 is larger than that of the U shape portion 312.

When the current shape data 11a and the existing shape data 11b are aligned, the positions of the L shape portion 301 and the L shape portion 311 are aligned with each other although not being shifted in the shape data. On the other hand, the U shape portion 302 and the U shape portion 312 are not aligned in a case where one of the U shape portion 302 and the U shape portion 312 is not shifted in a lateral direction.

Therefore, the shape search unit 22 may adopt the L shape portion 311 as the common shape data 12b, and may acquire mesh data 321 shown in FIG. 7(c) from the existing model database 11x as the common mesh data 13b.

Figure 8:
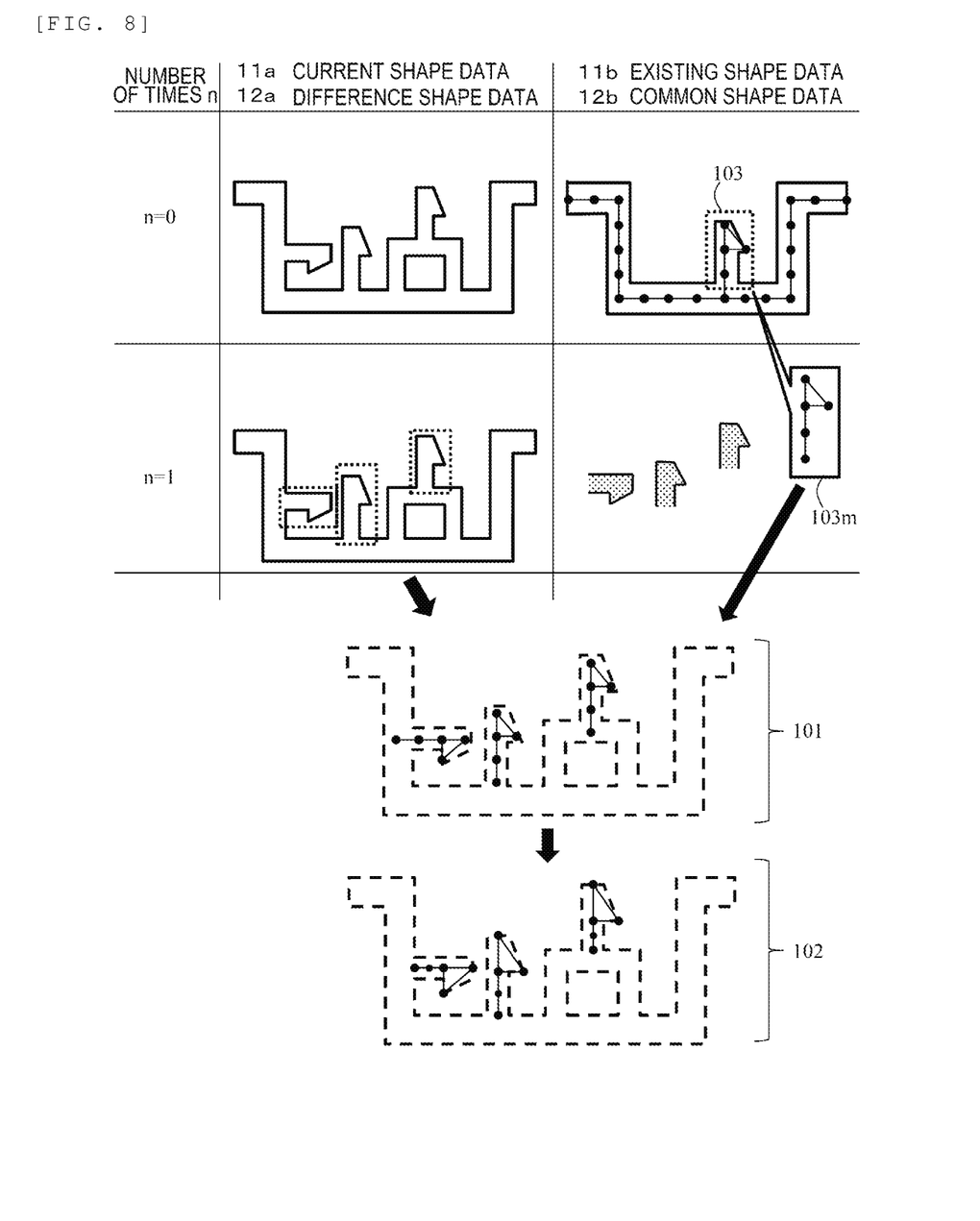
FIG. 8 is a diagram illustrating details of a process of the common mesh disposition unit according to an embodiment of the present invention.

FIG. 8 is a diagram illustrating details of the process of the common mesh disposition unit 23c.

In an upper side of FIG. 8, the current shape data 11a and the existing shape data 11b are exemplified as "n=0" row, and it is assumed that the search result of the shape search unit 22 indicting that three hook portions that are parts of the current shape data 11a as "n=1" row, and one hook portion 103 that is a part of the existing shape data 11b are similar in shapes is indicated.

In addition, it is assumed that the common mesh extraction unit 23b reads the existing mesh data 11c of a reference numeral 103m corresponding to the hook portion 103 of the existing shape data 11b from the existing model database 11x and inputs the existing mesh data 11c of the reference numeral 103m to the common mesh disposition unit 23c.

The common mesh disposition unit 23c disposes the input existing mesh data 11c at a corresponding position of the current shape data 11a as the disposition common mesh data 13c.

However, as shown in a reference numeral 101, in a case where the existing mesh data 11c is disposed as it is due to a partial similar size difference, a deviation such as a case where the node of the mesh is out of the hook portion occurs.

Therefore, as shown by a reference numeral 102, the common mesh disposition unit 23c transforms the input existing mesh data 11c, and then disposes the transformed existing mesh data 11c to the corresponding position of the current shape data 11a as the disposition common mesh data 13c, so as to eliminate the deviation (so as to be suitable for the corresponding position of the current shape data 11a).

As described above, the common shape data 12b and the existing shape data 11b match as the shape elements in some cases. However, the common shape data 12b and the existing shape data 11b are similar in many cases. Therefore, since it is necessary to adapt the existing shape data 11b to the common shape data 12b so that the position and a posture of the existing shape data 11b match with those of the common shape data 12b, the common mesh disposition unit 23c calculates a coordinate conversion matrix.

In addition, the existing shape data 11b and the common shape data 12b are merely similar to each other and do not always match with each other. For this reason, it is not possible to match all of pairs of the shape elements that are in a similar relationship. In this case, the coordinate conversion matrix is calculated based on an evaluation criteria indicator such as a disposition for minimizing a deviation amount between the pairs of the shape elements, and preferentially disposing the pair of the shape elements of which the similarity is high so that the deviation amount is reduced.

Next, a coordinate conversion is performed on the common mesh data 13b using the calculated coordinate conversion matrix. Finally, the common mesh data 13b on which the coordinate conversion is performed is deformed according to the deviation amount between the pairs of the shape elements, and registers the deformed common mesh data 13b as the disposition common mesh data 13c. For example, the mesh deformation process may be realized using the technique disposed in JP-A-2006-301753.

Figure 9:
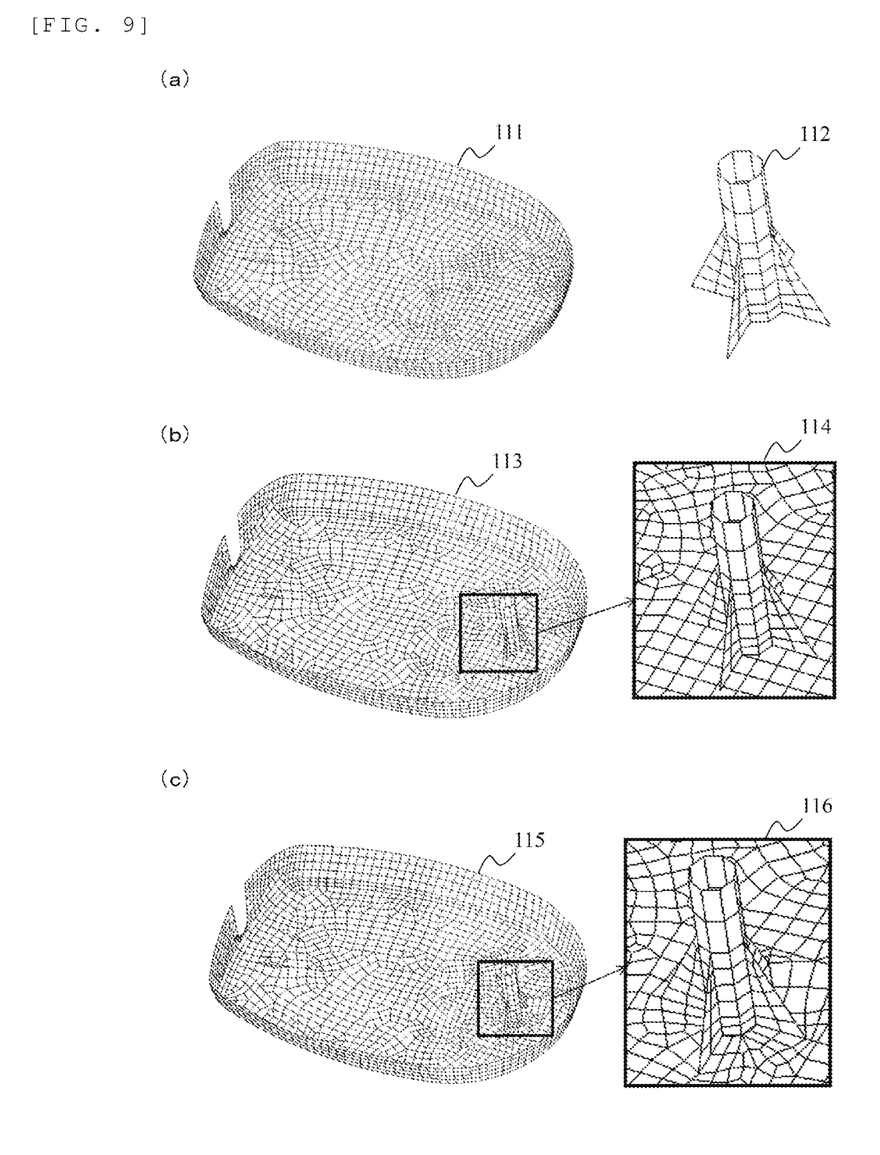
FIG. 9 illustrates three-dimensional diagrams illustrating each step of a combination process of the mesh combination unit according to an embodiment of the present invention.

FIG. 9 illustrates three-dimensional diagrams illustrating each step of the combination process of the mesh combination unit 24.

The mesh combination unit 24 combines the difference mesh data 13a indicated by a reference numeral 111 of FIG. 9(a) with the disposition common mesh data 13c of a reference numeral 112, and the combination result of is shown by a reference numeral 113 of FIG. 9(b) and a partial enlarged view (a reference numeral 114) thereof.

In addition, since a contact point portion between the difference mesh data 13a and the disposition common mesh data 13c is separated from each other at the step of the reference numeral 113, it is preferable to improve the mesh of which quality is degraded. Therefore, as shown by a reference numeral 115 of FIG. 9(c) and a partial enlarged view (a reference numeral 116) thereof, the mesh combination unit 24 creates the current mesh data 14 by combining the two meshes with each other.

Hereinafter, details of the mesh combination process will be described. The mesh combination unit 24 sequentially performs the process in the following procedures.

(Procedure 1) Elements that intersect with the disposition common mesh data 13c and the difference mesh data 13a are extracted, and the elements are divided at an intersection portion. The division process is performed for all of intersection elements.

(Procedure 2) With respect to the division result of the (procedure 1), the node is moved so that the node in the difference mesh data 13a is at the same coordinates as the node in the disposition common mesh data 13c. The meshes are combined with each other using a combination of such a method and other methods.

(Procedure 3) With respect to the combination result of the (procedure 2), a case where quality of the mesh is degraded, quality is improved. For example, it is possible to realize the procedure 3 using the technique disclosed in JP-A-2008-107960.

In the present embodiment described above, the analysis model creation assistance device 1 for creating the mesh of the analysis model corresponding to newly designed CAD data at low cost by diverting the existing data is shown. The created analysis model is utilized in a Computer Aided Engineering (CAE) system or the like that numerically simulates a physical phenomenon by a numerical analysis using a calculator.

First, the mesh to be created is different for each shape of the CAD data of the analysis target. Therefore, the existing mesh data 11c of which an analysis result is present and of which an acquisition of a sufficient accuracy is confirmed is registered in the existing model database 11x, the analysis model creation assistance device 1 may create the current mesh data 14 succeeding the shape and quality of the mesh by diverting a part of the existing mesh data 11c read from the existing model database 11x.

Here, as shown in FIG. 2, since the shape search unit 22 searches for partially similar shapes between the existing shape data 11b corresponding to the existing mesh data 11c and the current shape data 11a corresponding to the current mesh data 14, a preliminary preparation work such as creating "model CAD data" of PTL 1 becomes unnecessary.

On the other hand, in the related art disclosed in JP-A-2007-122205 and the like, a purpose for partially diverting the existing mesh data 11c is not disclosed, only when all pieces of the existing shape data 11b is included in the current shape data 11a, the existing mesh data 11c is diverted. Therefore, it is necessary to divide the analyzed CAD data into a plurality of partial shape parts (the existing shape data 11b). In addition, since a result of the similarity with the shape registered in a database is changed by a division method, know-how is necessary.

In addition, the present invention is not limited to the embodiments described above, but includes various modifications. For example, the embodiments described above have been described in detail in order to describe the present invention so that it is easy to understand the present invention, and are not necessarily limited to those having all the described configurations.

In addition, it is possible to substitute a part of the configuration one embodiment for a configuration of another embodiment. In addition, it is possible to add the configuration of another embodiment to the configuration of one embodiment.

In addition, it is possible to add, delete, and replace another configuration with respect to a part of the configuration of each embodiment. In addition, each of the above-described configurations, functions, process units, process means, and the like may be realized by hardware by designing apart or all of the above-described configurations, functions, process units, process means, and the like by, for example, an integrated circuit.

In addition, the above-described configurations, functions, and the like may be realized by software by interpreting and executing a program that realizes each function by a processor.

Information such as a program, a table, and a file that realizes each function may be stored in a memory device such as a memory, a hard disk, or a Solid State Drive (SSD), a recording medium such as an Integrated Circuit (ID) card, an SD card, and a Digital Versatile Disc (DVD).

In addition, a control line or an information line indicate an element that is considered to be necessary to be described, and all control lines and information lines are not necessarily to be indicated on a product. Actually, it may be considered that almost all of structures are connected with each other.

In addition, communication means for connecting each device is not limited to the wireless LAN, and may be changed to a wired LAN or other communication means.

REFERENCE SIGNS LIST

1: analysis model creation assistance device
11a: current shape data
11b: existing shape data
11c: existing mesh data
11x: existing model database
12a: difference shape data
12b: common shape data
13a: difference mesh data
13b: common mesh data
13c: disposition common mesh data
14: current mesh data
21: creation target registration unit
22: shape search unit
23a: difference mesh generation unit
23b: common mesh extraction unit 23b
23c: common mesh disposition unit
24: mesh combination unit

The invention claimed is:

1. An analysis model creation assistance device comprising:
an existing model database that associates analyzed existing shape data, which is computer-aided design (CAD) data with existing mesh data that is an analysis result of the existing shape data; and
a processor coupled to the existing model database, programmed to:
receive input of current shape data, which is CAD data,
repeat a process of comparing each shape element of the input current shape data with each shape element of the existing shape data, automatically determining and including a set of shape elements that are identical to each other as a result of the comparison as common shape data, determining a set of shape elements that are different from each other as difference shape data, automatically comparing each shape element of the previously determined difference shape data with each shape element of the existing shape data, determining and including a set of shape elements that are identical to each other as a result of the comparison as the common shape data, and determining a set of shape elements that are different from each other as a next difference shape data,
search for corresponding existing mesh data using the common shape data as a search key and extract common mesh data as a search result,
create difference mesh data based on the difference shape data,
dispose each common mesh data at a corresponding position of the current shape data and set the disposition result as disposition common mesh data, and
automatically combine the difference mesh data with the disposition common mesh data to create current mesh data corresponding to the input current shape data.

2. The analysis model creation assistance device according to claim 1,
wherein the processor is programmed to:
determine that the shape elements are identical when the lengths of line segments that are the shape elements are identical.

3. The analysis model creation assistance device according to claim 1,
wherein the processor is programmed to:
determine that the shape elements are identical when the areas of surfaces or a sum of the lengths of sides configuring the surfaces that are the shape elements are identical.

4. The analysis model creation assistance device according to claim 1,
wherein the processor is programmed to:
wherein, in a process of determining the next difference shape data from the previous difference shape data, when a plurality of candidates of the common shape data that are identical to the difference shape data or the current shape data are present, adopt the largest common shape data among the candidates.

5. An analysis model creation assistance method,
wherein an analysis model creation assistance device includes an existing model database, and a processor that executes a shape search unit, a common mesh extraction unit, and a mesh combination unit, the method comprising:

in the existing model database, analyzing existing shape data, which is computer-aided design (CAD) data and associating the analyzed existing shape data with existing mesh data that is an analysis result of the existing shape data;

receiving an input of current shape data, which is CAD data;

repeating a process of, by the shape search unit, automatically comparing each shape element of the input current shape data with each shape element of the existing shape data, determining and including a set of shape elements that are identical to each other as a result of the comparison as common shape data, determining a set of shape elements that are different to each other as difference shape data, automatically comparing each shape element of previous difference shape data with each shape element of the existing shape data, determining and including a set of shape elements that are identical to each other as a result of the comparison as the common shape data, and setting a set of shape elements that are different from each other as a next difference shape data;

searching, by the common mesh extraction unit, for corresponding existing mesh data using the common shape data as a search key and extract common mesh data as a search result;

creating difference mesh data based on the difference shape data; and disposing each common mesh data at a corresponding position of the current shape data and set the disposition result as disposition common mesh data; and automatically combining, by the mesh combination unit, the difference mesh data with the disposition common mesh data to create current mesh data corresponding to the input current shape data.

\* \* \* \* \*